Figure 1:
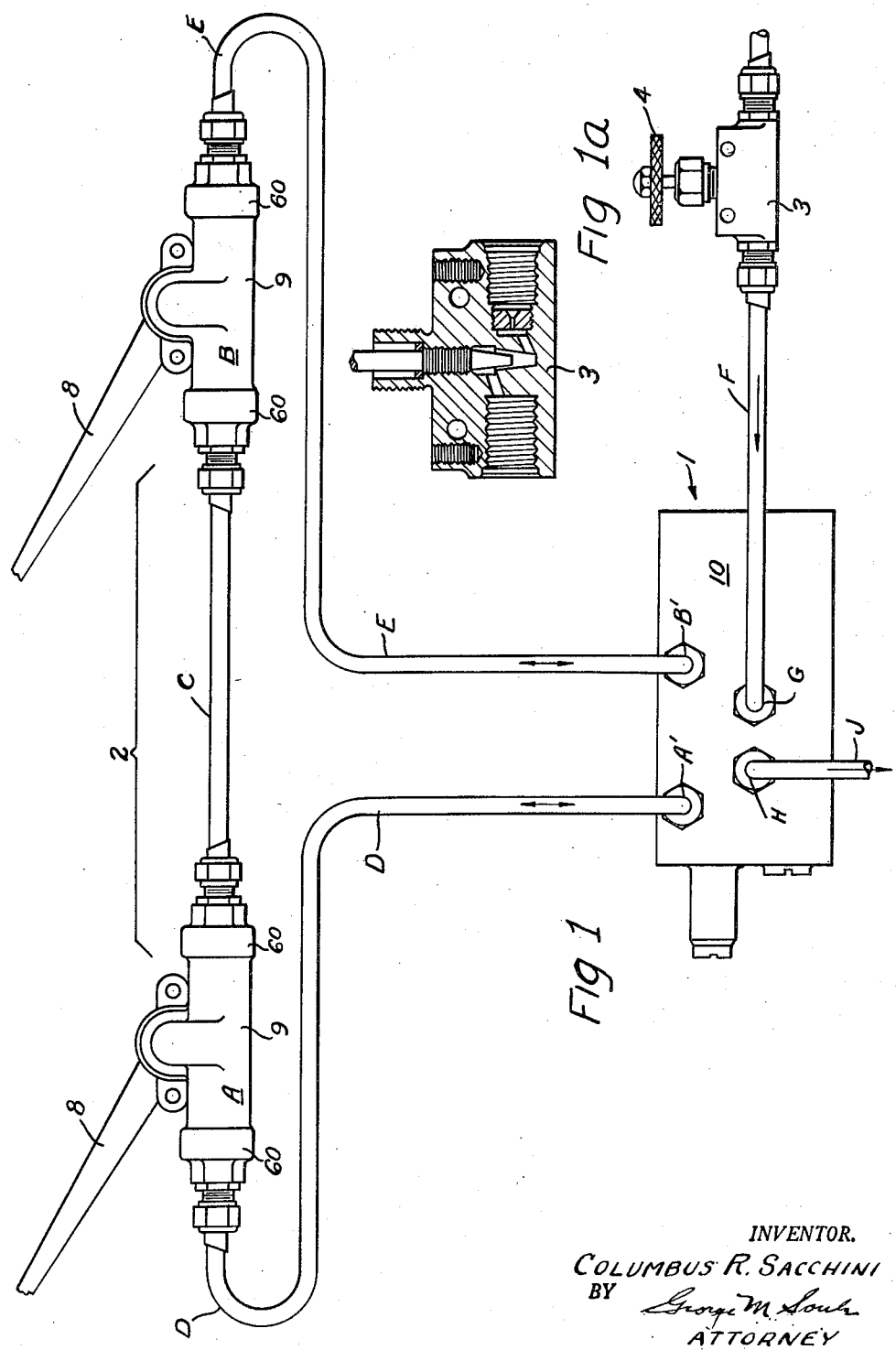

April 3, 1951  C. R. SACCHINI  2,547,175
WINDSHIELD WIPER MECHANISM
Filed Dec. 30, 1947  6 Sheets-Sheet 1

INVENTOR.
COLUMBUS R. SACCHINI
BY
George M. Soule
ATTORNEY

April 3, 1951  C. R. SACCHINI  2,547,175
WINDSHIELD WIPER MECHANISM
Filed Dec. 30, 1947  6 Sheets-Sheet 5

INVENTOR.
COLUMBUS R. SACCHINI
BY George M. Louk
ATTORNEY

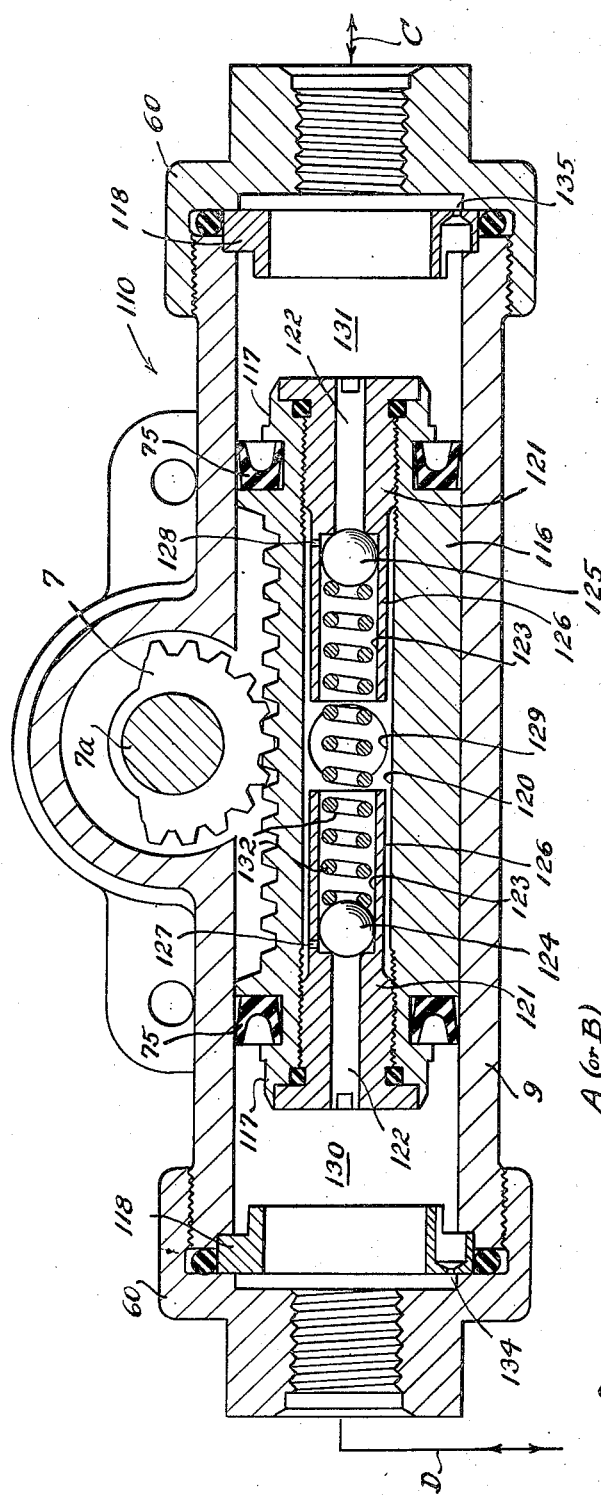

Patented Apr. 3, 1951

2,547,175

UNITED STATES PATENT OFFICE 2,547,175

WINDSHIELD WIPER MECHANISM

Columbus R. Sacchini, Willoughby, Ohio, assignor to The Marquette Metal Products Company, Cleveland, Ohio, a corporation of Ohio Application December 30, 1947, Serial No. 794,551

9 Claims. (Cl. 60—97)

1

This invention relates primarily to a fluid-operated mechanism adapted for oscillating or reciprocating one or more windshield wiper blades over a surface or surfaces to be cleared. The principal novelty, indicating one object, resides in the provision of an improved automatically acting fluid motor actuator unit supplied with pressure fluid from any suitable source and arranged to divert pressure fluid alternately to opposite ends of a closed loop reciprocating servomotor mechanism and to exhaust spent fluid alternately from said ends. The servomotor mechanism as shown hereby comprises a plurality of cylinder and piston units connected for example in series, spaced any desired distance apart and arranged to operate windshield wiper drive arms in synchronism; a further object being indicated by the fact that, regardless of the number and spacing of piston and cylinder units employed in the system, the quantity of fluid consumed at a given speed in a given period of time is the same.

A further object is to provide a relatively simple and accurately operating fluid-reversing valve mechanism for supplying operating fluid to a plurality of reciprocating servomotors adapted to operate in a closed loop circuit and wherein blocking of the normal operation of one only of the servomotors prior to reaching the end of its normal stroke will cause the mechanism to continue in operation at full strength for effecting shorter than normal strokes until the cause of such blocking is removed.

Another object is to provide an improved and simplified fluid-operated reciprocating window wiping servomotor unit capable of being used singly or in pairs or groups connected in series with each other and, in event of such series connected arrangement, maintainable normally and automatically in synchronism.

Further objects include provision of a window unit piston and cylinder mechanism which when used in pairs or any plurality connected with an automatic actuator or reversing valve unit rendered operative to effect reversal of fluid flow in response to a predetermined rise in output pressure in such unit, which mechanism can be effectually locked in any desired parking position by a sealed fluid column, and which mechanism will permit one piston of the pair or plurality of window units to become blocked in any possible position while enabling the remaining piston or pistons to continue in full stroke operation.

Further objects include provision of a fluid

2 motor actuator unit for reversibly supplying and exhausting operating fluid in respect to one or more reciprocating servomotors wherein the reversing operation is accomplished by the use of two spring biased pressure operated valving plungers or plunger assemblies so arranged that pressure build-up in the system to a predeterminable point causes the reversing operation to take place irrespective of length of stroke on part of the servomotor or motors.

Another object is to provide an improved window or windshield wiping system operable by fluid pressure under the control of a master actuator unit and wherein parking of the wiping element or elements in a particular position or positions results merely from gradually restricting and then closing a fluid supply valve leading to the actuator unit, which supply valve is also operable to adjust the speed of operation of the wiping mechanism.

A specific object is to provide a reversing valve mechanism such as outlined above wherein the moving parts are few in number, simple in construction and capable of being easily assembled in properly working relationship.

Other objects and features of the invention will become apparent from the following description of preferred embodiments.

Figure 2:
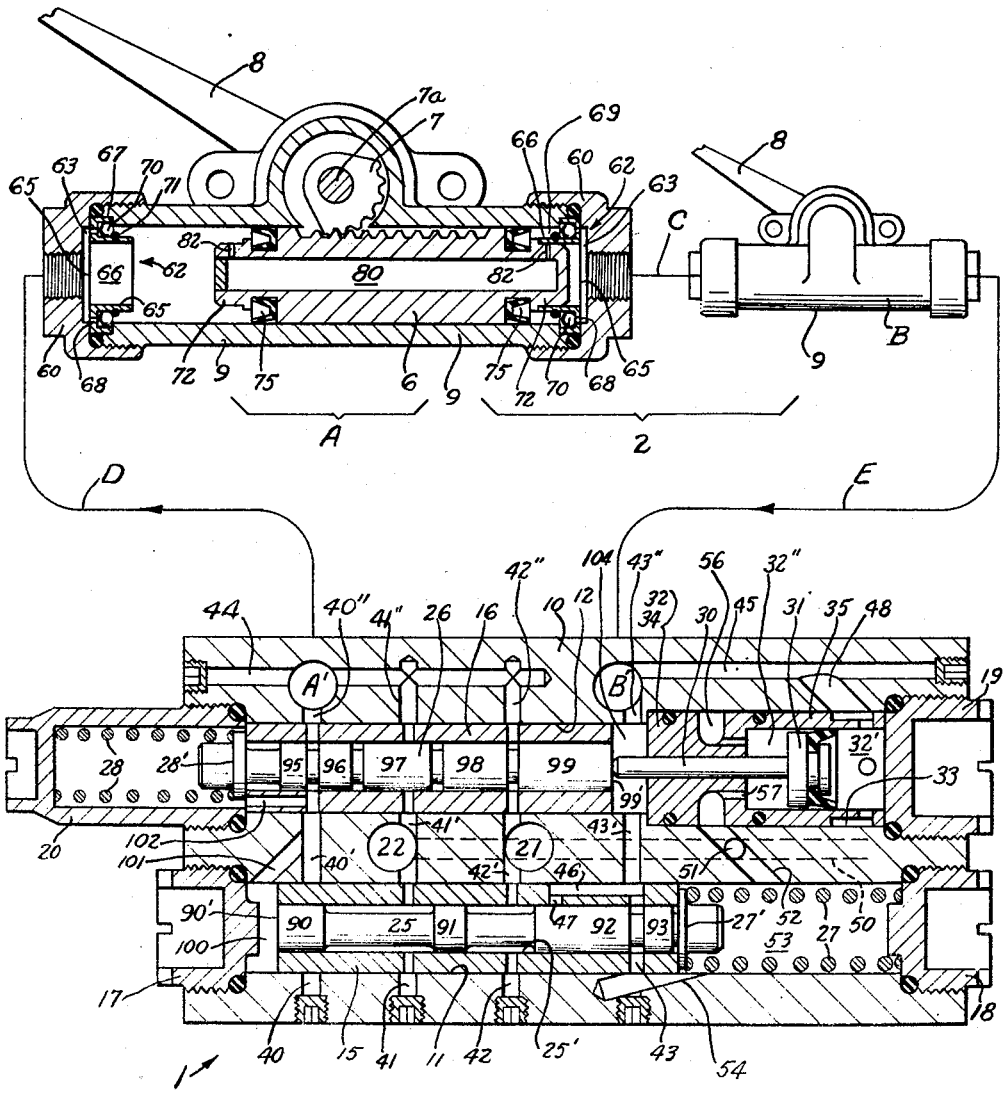
Figure 3:
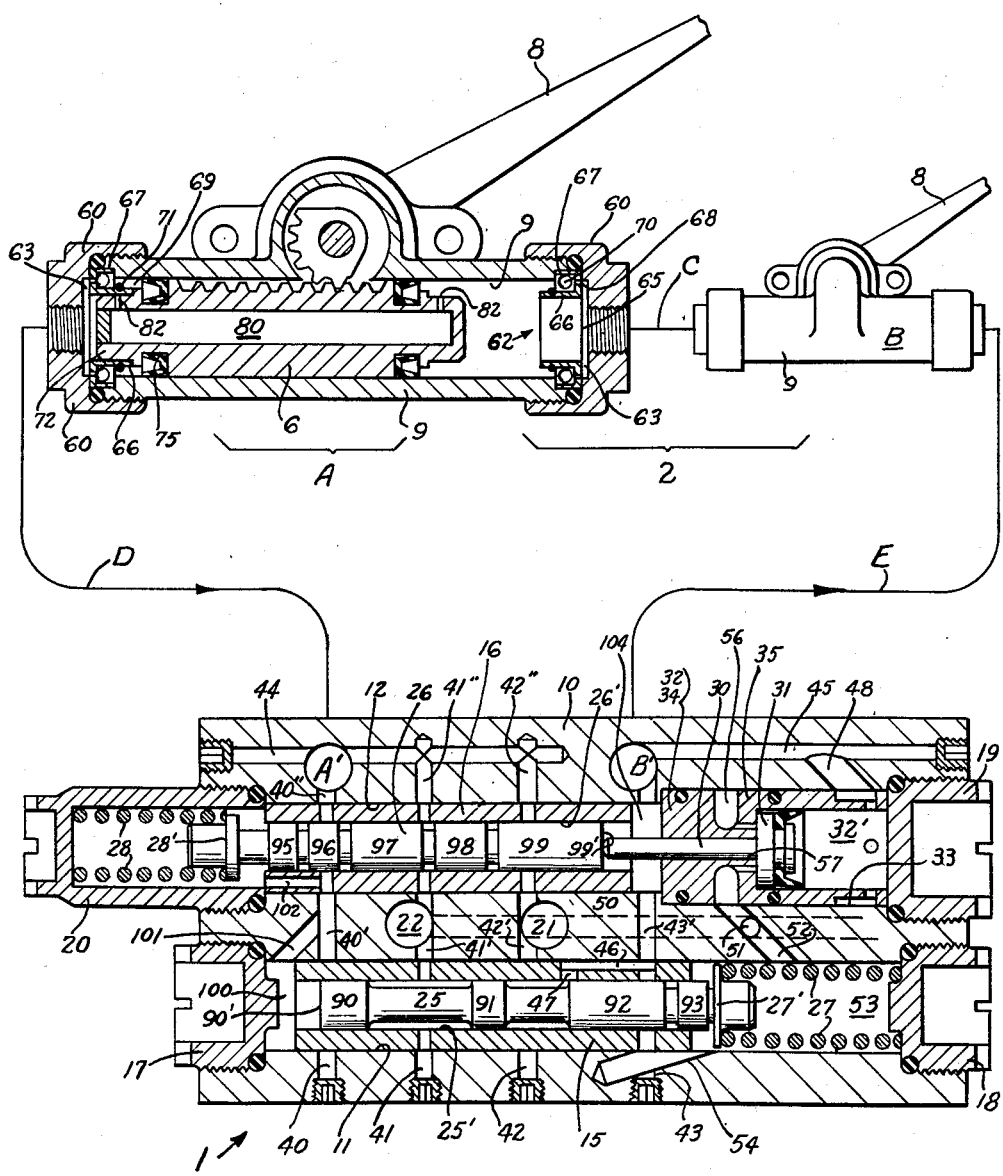
Figure 4:
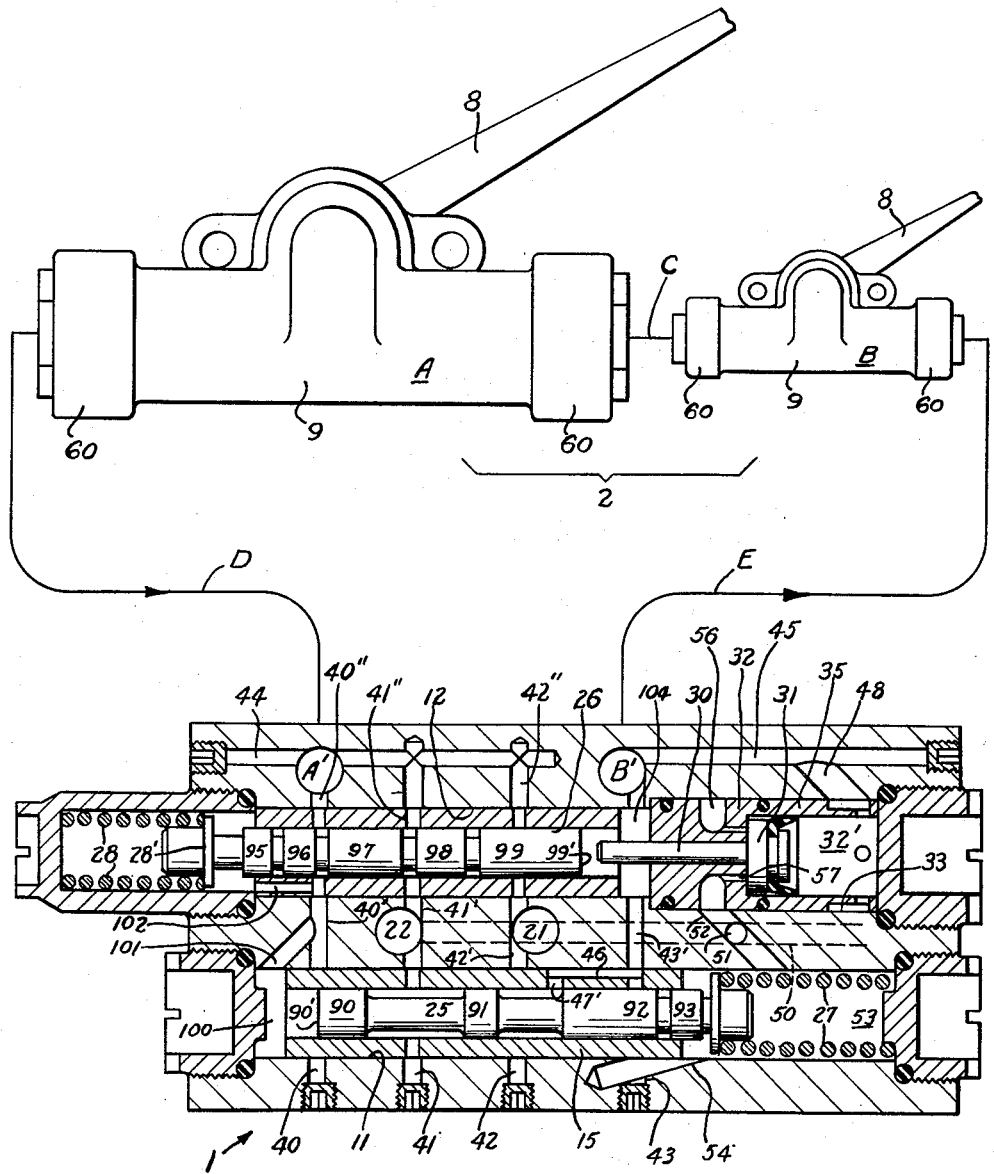
Figure 5:
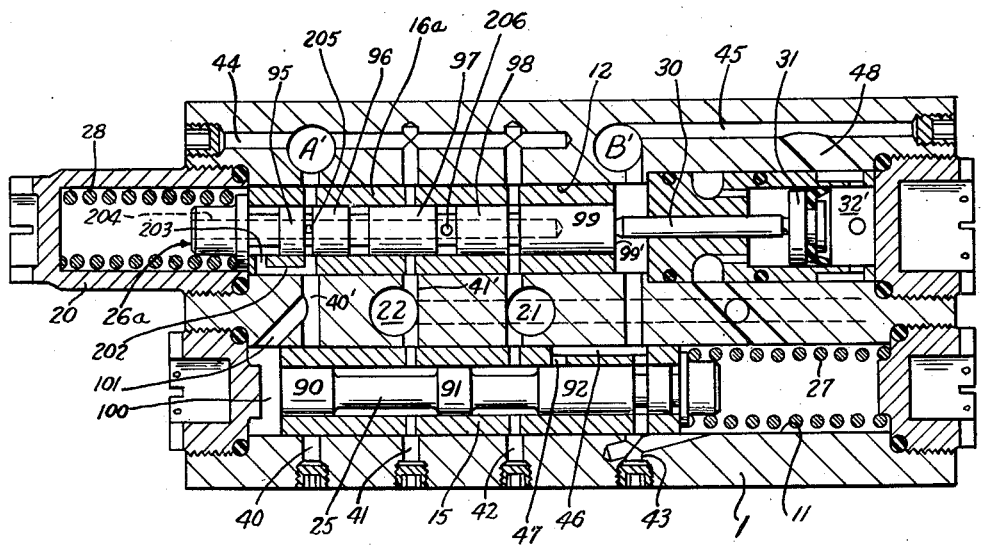
Figure 6:
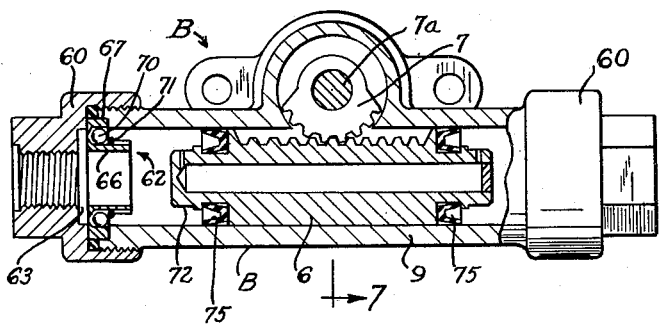
Figure 7:
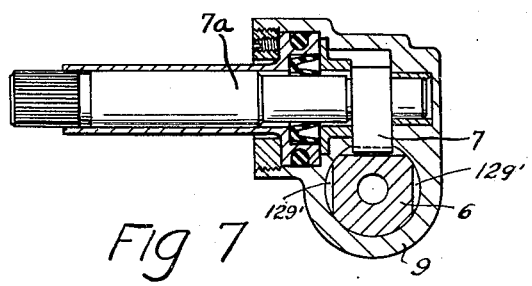

In the drawings, Fig. 1 is a diagrammatic assembly view showing the present invention arranged for controlling two wiper-blade-reciprocating window units connected in series with each other; Fig. 1a is a relatively enlarged sectional view of a speed control and fluid shut-off valve. Figs. 2, 3 and 4 are enlarged sectional assembly views respectively showing the parts of the reversing mechanism and window units in different operating positions. Fig. 5 is a view corresponding to the lower part of Fig. 2 showing a modified fluid-reversing mechanism; Fig. 6 is a longitudinal central sectional view of a window unit plunger and cylinder assembly, and Fig. 7 is a cross sectional view taken as indicated on line 7—7 of Fig. 6. Fig. 8 is a view corresponding to Fig. 6 showing a modified form of window unit piston and cylinder assembly.

*Master actuator unit (construction)*

Referring to Fig. 1, a master actuator unit 1 supplies the window unit assembly 2 comprising, in the illustrated arrangement, two identical servomotor or window wiping units A and B (B shown in reduced scale) having their inboard ends connected together by suitable fluid transmission conduit means such as a tube C. The outboard end of unit A is connected as by the tube D to a service port A' of the actuator unit 1. The outboard end of the unit B is connected by a similar tube E to a service port B' of the actuator unit.

The actuator unit 1 is supplied through a main speed control and shut-off valve 3 (Figs. 1 and 1a) controllable as by a handle 4, said valve being connected as by a tube F to a pressure inlet port G of the actuator unit. An exhaust fluid outlet port H of the actuator unit 1 is connected as by a tube J to a reservoir portion of the pressure supply system (e. g. pump, accumulator, etc., not shown).

As indicated by the arrow on tube F, pressure fluid always moves from the control valve 3 toward the pressure inlet G of the unit 1 but the fluid as indicated by the arrows on tubes D and E moves in either of two directions in each of those tubes depending upon the instantaneous direction of motion on part of the window units A and B. Each of said window units A and B shown in Figs. 3 to 4 (B shown in section in Fig. 6) has a power piston 6 in a cylinder 9 and power take-off means such as a toothed pinion or sector 7 (cf. Fig. 7) in mesh with corresponding teeth of the piston; and the pinions or sectors 7 are drivingly rigid with shafts 7a for supporting respective oscillatable wiper drive arms 8. The window units A and B are exactly alike, wherefore only one will be described in detail, the corresponding parts of both units being given the same identifying characters.

Referring to the actuator unit 1, this comprises a suitable generally rectangular metal body 10 having main parallel bores 11 and 12 therethrough in which are preferably located and fixedly secured laterally ported valve sleeves 15 and 16 respectively. The ends of the bores 11 and 12 are closed by suitable sealing plugs indicated 17, 18, 19 and 20, the plug 20 being of special form in that it constitutes a housing for a valve return spring later described. The main bores 11 and 12 are intersected by various cross passages, the positions and different portions of which will be referred to as upper, lower, right, left, etc. for reference purposes only. The unit 1 and the window units will, of course, operate in any conceivable position.

The pressure fluid inlet port G, Fig. 1, communicates with the body 10 at a short main cross inlet passage 21, Figs. 2-4, located between the bores 11 and 12. The outlet port H, Fig. 1, constantly communicates with a cross passage 22, Figs. 2-4, in the body.

The fixed valve sleeve 15 slidably contains a main or master fluid directing valve plunger 25 which for simplicity will usually be referred to as the directional valve. The fixed valve sleeve 16 similarly contains a cooperating fluid directing valve plunger or slave valve 26. Cross ports in the sleeves and body connect the cooperating valve bores 25' and 26' in the sleeves. Before admission of minimum operating pressure to the unit (e. g. 1100 p. s. i.) the directional valve 25 occupies the normal or inactive position shown in Fig. 2, said valve being spring biased into that position as by a coil spring 27 located in the right hand portion of the bore 11 unoccupied by the valve sleeve 15. The corresponding normal or inactive position of the slave valve 26 is as shown in Fig. 2, said valve being spring biased into that position by a coil spring 28 contained within the hollow plug 20. The springs act inwardly in opposite directions against respective shoulders 27' and 28' of the valve plungers, which shoulders abut associated ends of the fixed valve sleeves 15 and 16 as stops.

In order to move the slave valve out of its normal position, the end thereof opposite the return spring 28 is abutted by a stem portion 30 of a positioning servomotor plunger or piston 31 contained in a fixed sleeve or working cylinder 32 peripherally sealed in a counterbore portion 33 of the bore 12. Full diameter land portions 34 and 35 of the servo cylinder 32 are in sealed relation to the counterbore and the plug 19 holds the cylinder against the bottom of the counterbore. The servomotor piston 31 is shown in its normally occupied position in Fig. 2 being intermediate the effective ends of the cylinder pressure chamber 32' by virtue of the spring 28 acting on the slave valve 26 and therethrough on the stem 30 of the positioning servomotor plunger.

The cross passages necessary to communicate the supply and exhaust passages 21 and 22 with the directional valve and slave valve and with the service ports A' and B' may comprise vertical cross drillings as at 40, 41, 42, and 43 (left to right) which intersect the main body bores 11 and 12 and extend upwardly therebeyond for communication with one or the other of the service ports A' and B'. The upward extensions of the passages 40, 41 and 42 communicate with service port A', leading to the outboard end of the window unit A, partly by intersecting a longitudinal drilled passage 44 in the left end of the body 10 passing through the service port A'. The vertical passage 43 terminates upwardly at the service port B' to which a longitudinal drilled passage 45 similar to the passage 44 extends from the right end of the body. The relatively outer ends of all the passages from 40 to 45 are suitably plugged as indicated. Portions 40', 40'', etc. of the vertical passages 40, 41 and 42 align and communicate with associated radial valve-port-forming holes in one or both of the valve sleeves 15 and 16. The portion 43' of the passage 43 connects at the upper end with a full diameter pressure chamber portion 184 of the bore 12 which receives the slave valve sleeve. The lower end of the portion 43' connects with a longitudinal slot 46 in the upper wall of the directional valve sleeve 15. The left end of the slot connects with a short radial passage 47 leading into the directional valve sleeve bore 25' so that the vertical cross passage 43 has two axially spaced port openings through said sleeve. The longitudinal passage 45 at the upper right portion of valve body 10, intersects an oblique passage 48 which in association with suitable circumferentially spaced ports in the servomotor cylinder sleeve 34 is constantly open into the servomotor cylinder pressure chamber 32'.

The main exhaust port 22 of the body 10, in addition to intersecting the cross passage portion 41', is intersected by a longitudinal passage 50 formed in the body beyond the inner end of the pressure inlet port 21 and extending to the right of the exhaust port. The passage 50 intersects a cross passage 51 between the main valve bores, which cross passage intersects an oblique passage 52, one end of which extends to the chamber 53 containing the directional valve return spring 27. Said chamber 53 is always in open communication with the lower end of the vertical passage 43 through a short oblique bore 54 in the body so as to connect the service port B' with the exhaust port 22 in the normal position of the directional valve. The upper end of the oblique passage 52

(below the servomotor) communicates with an annular cavity 56 formed as a reduced diameter portion of the cylinder 34; and short vent passages 57 leading into the servo cylinder chamber 32" at the left of the servomotor piston constantly communicates said chamber 32" with the exhaust port 22 through the longitudinal bore 59. Thus the servomotor piston 31 is free to move to the right under the influence of the slave valve spring 28 when the directional valve is in its normal or initial position.

The various port closing lands of the directional valve plunger 25 are numbered 90 to 93 from left to right. The valving lands of the slave valve plunger are similarly numbered 95 to 99.

To provide for fluid actuation of the directional valve or plunger 25 into its circuit-reversing position and retaining of said valve in that position during the necessary part of the complete cycle of operation, a pressure chamber 100 is formed at the left end face 90' of the directional valve plunger. The chamber is defined by the plug 17, bore 11, valve sleeve 15 and the face 90' of the valve plunger; and an oblique passage 101, and portion 40' of vertical passage 40 communicate the pressure chamber 100 with the interior of the slave valve sleeve 16 through a cooperating portion, said valve sleeve registering with passage portion 40'. Additionally said cooperating port in the slave valve sleeve is intersected by a longitudinal eccentric bore or passage 102 leading into the housing for the slave valve spring 28. The arrangement, as more fully described under the heading "Operation," is such that said spring housing 20, in cooperation with the slave valve plunger 26, becomes a booster pressure chamber communicating continuously with the pressure chamber 100 to insure the desired full porting movement of the directional valve plunger in its first reversed-fluid-circuit-establishing movement (Fig. 3) against the operation of its biasing spring 27.

*Window units (construction and operation)*

The window units A and B, as illustrated, are operatively identical at opposite ends, hence reversible end-for-end in the system. Referring to the window unit A (Fig. 2, for example) the service tube D communicates with the outboard end of the cylinder 9 through a suitable fitting 60 threaded and sealed to the cylinder. The opposite end of the cylinder 9 has an identical fitting 60 for connection with the tube C. Each end of each cylinder 9 contains a dashpot mechanism or unit 62. Those are of identical construction to be described presently.

Assuming operation of the system has caused the piston 6 of window unit A to be brought to the position thereof shown by Fig. 3 and that operating pressure is established in the service tube D, operating pressure is built up in a chamber 63 defined in part by the adjacent end of the piston 9, in part by the fitting 60 and in part by the central bore of an annular dashpot cylinder member 65 clamped between the window unit cylinder 9 and the fitting 60 at a flange portion 67 of cylinder 65. The dashpot and check valve cylinder members 65 and their associated check valve plugs (to be described) are oppositely positioned at opposite ends of each window unit cylinder 9. An inner sleeve portion 66 of each dashpot cylinder 65 slidably receives, with a few thousandths of an inch total clearance, a cylindrical extension 72 of the piston 6 at the end of respective strokes of said piston.

Each dashpot unit 62 is constituted by one of the piston extensions 72, an associated sealing cup or ring 75 on the piston, sealingly fitting the bore of cylinder 9, the adjacent portion of the main cylinder wall and the flange 67, which latter during dashpot action is closed against outward passage of fluid therethrough by check valves 68, 70 in the flange.

The illustrated check valve arrangement comprises small check valve port openings 68 through each flange 67, the inner ends of which openings intersect suitable valve seats formed by counterbores in said flange. The counterbores form valve chambers for the plug elements 70, shown as spherical, which plug elements are held against falling out of their chambers by a common snap ring 71 embracing the sleeve portion 66 of the dashpot cylinder member.

At the beginning of each stroke of each piston 6, assuming continuing operation, the sleeve portion of the dashpot cylinder 65 (left of window unit A, Fig. 3 for example), is momentarily occupied by the reduced diameter cylindrical portion or extension 72 of the piston. Since the check valves, just described, open toward the piston, pressure fluid entering the chamber 63 opens the check valves and exerts pressure on the full diameter end area of the piston before the extension 72 is withdrawn from the dashpot.

The pistons 6 are axially chambered at 80 for nearly their entire length, being bored nearly therethrough from one end and the open ends of the bores then suitably plugged as illustrated. Very small radial priming passages 82 (e. g. 1/64" diameter) at opposite ends of each piston communicate with the chambers 80. The radially outward ends of the priming passages 82 intersect the peripheries of the piston extensions 62 so that the passages are open during the principal parts of the piston strokes but substantially closed by respective dashpot sleeves 66 near the ends of the piston strokes.

When the piston extensions 72 enter the sleeve portions 66 and close the priming passages 82, the check valves seat and establish generally closed annular fluid spaces 69 (left, Fig. 3), the only instantaneous outlet of which is along the extension 72 and the bore of the sleeve portion 66 entered by the extension. Thus the cushioning action of the dashpot units at the end of each stroke of each piston in either direction is one of forcing operating fluid through the associated clearance space around a piston extension 72.

Assuming the entire system has been charged with operating fluid and that the pistons 6 are similarly in parked positions in their cylinders 9, it will be apparent that fluid alternately admitted to and simultaneously exhausted from units A and B will cause synchronous operation of the drive arms 8. That operation will continue so long as the units A and B are nearly equally loaded, notwithstanding the fact that during the larger part of each stroke of each piston a throttled or restricted by-pass fluid circuit is established from tube D to tube E through the priming passages 82 and piston cavities 80. Now assuming that (as by local accumulation of ice on the windshield) an excessive load is imposed on the piston 6 of unit A, while it is travelling to the left, preventing the piston from performing a full stroke into the position illustrated in Fig. 3. Such overloading of unit A piston, if of sufficient magnitude to stop that piston in some mid-stroke position, will ordinarily cause a re-cycling of the actuator unit 1 before either piston has completed its stroke. Now because both pistons have the same open throttled communication through the priming passages 82 and piston cavities 80, more fluid will travel through the throttled passages of unit A piston than through those of unit B and the drive arm of unit B will begin to overtake the drive arm of unit A thus getting out of synchronism therewith. If the excessive loading is not removed the two window units will continue to perform short strokes with concomitant overtaking increments occurring on each cycle until the overloading is removed or operation is discontinued. After removal of the overload the piston of unit A will automatically attain its synchronized position in a short time as follows: Assuming piston 6 of unit A is leading the piston of the companion unit B during travel of the two toward the left, the unit A piston will first come to the end of its stroke and by closing its left hand primer passage 82 cause re-cycling of the actuator mechanism 1, since re-cycling as already indicated and more fully explained below is a function of rise in fluid pressure in either of the service tubes D or E. The unit B then exhausts through tube E and normal operating fluid pressure in tube D begins movement of both pistons 6 toward the right. Since the piston of unit A at the beginning of the rightward stroke is sealed at its left hand primer passage 82 the initial movement of the unit A piston will occur without any loss of fluid through its primer passages whereas the unit B piston will have such fluid loss and will not on that stroke be moved as far as the unit A piston will be moved. During succeeding strokes to the right the same phenomenon occurs until the two window units again operate in synchronism.

The window unit system obviously operates in the same manner if the piston of unit B becomes blocked against full stroke movement. In order initially to charge the system with operating fluid it is only necessary to operate the mechanism until all pocketed air is driven out of the exhaust line of the actuator unit. That ordinarily takes only a few cycles of operation.

*General operation*

Referring to Fig. 2 which, as stated above, shows the various parts including the window unit servomotor pistons 6 in normal or initial (parking) position, it will be seen that the main inlet pressure port 21 of the body 10 communicates through the passage 42' with a necked portion of the slave valve plunger 26 between lands 98 and 99 thereof, thus, through the body passages 42" and 44 applying operating pressure to fluid in the tube D tending to move the piston of window unit A to the right. Any movement of said piston to the right also moves the piston of window unit B to the right through the intermediary of the column of fluid in the tube C and associated connections. Admission of such pressure fluid is enabled by concurrent establishment of an exhaust circuit from the window unit B through the service port B', cross passage portion 43", chamber 104 constituted by the right end of slave valve bore 12, passage portion 43', then aligned necked portion of the directional valve plunger between lands 92 and 93 thereof, oblique passage 54, spring chamber 53, oblique passage 52, cross passages 51 and longitudinal passage 50 leading to the exhaust port 22.

Assuming the window unit pistons 6 are in some position other than their right hand or parking positions, they will, by establishment of the described fluid circuits, be driven to the right hand ends of their respective cylinders 9 until the right hand dashpot piston portions 72 enter the corresponding dashpot sleeves 66. Thereupon motion of the pistons will be gradually arrested. The inboard check valves 70 of window unit A and the outboard check valves of window unit B close approximately when the projections 72 enter the dashpot sleeves. Arrest of piston movement in either direction usually occurs (at least at high operating speed) when the piston portions 72 have fully entered the dashpot sleeves to the positions shown, since some fluid can escape from the dashpots around the piston portions 72 and some through the check valve ports before the plugs 70 are fully seated.

As soon as either window unit piston is arrested as by the right-hand dashpots 62 or from any other cause, such as blocking of a wiper arm prior to full stroke thereof, pressure in the supply circuit leading to the service tube D immediately rises with the following results: Pressure fluid moves in the cross passage 40' and 40" as enabled by the position of slave valve lands 95 and 96 shown on Fig. 2; and thereby, through the oblique passage 101, raises the then existing pressure in the chamber 100 at the left end of the directional valve plunger 25. The pressure rise in chamber 100 causes movement of the directional valve plunger to the right until the port passage 47 communicating with the longitudinal slot 46 of the directional valve sleeve 15 is at least slightly opened. Said movement of the directional valve plunger causes its land 92 to cut off the portion of the exhaust circuit for window unit B constituted by the lower end of the cross passage 43.

As the directional valve stroke just described is completed, pressure fluid is admitted to the intermediate portion 43' of the cross passage 43, thence to the chamber 104 between the slave positioning piston and cylinder assembly and the slave valve plunger and thence to the outboard end of the window unit B. Concurrently, operating fluid pressure from the service port B' is established in the longitudinal bore 45 (upper right of body 10) oblique passage 48 etc. leading to the servomotor pressure chamber 32'. The pressure acts upon the servomotor piston 31 moving it to the left for its full possible stroke as evident from Fig. 3, moving the slave valve 26 to the position shown by Fig. 3. Said movement of the slave valve, as shown by comparison of Figs. 2 and 3, cuts off the previous operating pressure supply to the tube D between lands 98 and 99 of the slave valve and opens the cross passage portions 41' and 41" to communication between the lands 97 and 98 of the slave valve. Additionally the land 96 of the slave valve now closes the cross passage portion 40' leading to the directional valve chamber 100 (lower left of body 10) thus hydraulically restraining the directional valve against return movement by its spring 27. Opening of the cross passage portions 41' and 41" establishes, through longitudinal passage 44, port A' and tube D, an exhaust circuit for the outboard end of window unit servomotor A as will be evident from Fig. 3.

As the slave valve plunger 26 moves to the left beyond the position necessary to trap fluid in the chamber 100, as described, the portion of said plunger which projects into the return spring housing 29 forces fluid from said housing through the eccentric passage 102, passage 40' and duct 101 into the pressure chamber 100 adding to the fluid trapped in said chamber and forcing the directional valve further to the right sufficient to insure that the port 47 of the directional valve sleeve already supplying fluid to the outboard end of the cylinder of window unit B, will not, by throttling the flow at said port 47, restrain the leftward movement of the window unit pistons. Since there is no corresponding tendency toward restraining the rightward movement of the window unit pistons a restraint at port 47 would have caused a loping movement of the wiper arms 8, i. e., faster in one direction than in the other.

The pressure and exhaust circuits established as described above causes both pistons 6 to be driven to the left into the positions shown by Fig. 3 or some intermediate stopped position, assuming in the latter case that movement of one or the other of the wiper arms has been effectively blocked short of its full stroke. Pressure now rises in the pressure supply circuit leading to the window unit B, and since the slave valve positioning servomotor piston 31 cannot be moved any further to the left, the increased pressure acts on the right hand end piston face surface 99' of the slave valve plunger. The slave valve plunger is thereby moved into the position thereof shown in Fig. 4 wherein the neck between the lands 96 and 97 opens the cross passage 40' allowing the theretofore trapped fluid in the pressure space 100 to return to sump pressure by way of exhaust through service port A', longitudinal passage 44 and cross passage 41. Said leftward final movement of the slave valve plunger simultaneously establishes (partly by the same port opening operations) an exhaust circuit for the outboard end of the window unit cylinder A, the fluid path being A', 44, 41'', 41' to 22. The spring 27 of the directional valve now returns the directional valve plunger to its initial position as shown on Fig. 2, opening the port 43 to vent the space 104; and the slave valve spring 28 then returns the slave valve plunger and the slave valve positioning servomotor piston 31 both to their original positions. The exhaust circuit for window unit A, through tube D, is broken by the land 97 of the slave valve (see Fig. 2); the neck between slave valve lands 98 and 99 reestablishes the pressure supply circuit to the outboard end of the window unit A, the returned directional valve plunger having completed reversal of the circuits as already described.

While the system as shown in Fig. 1 and others operates to move the window unit pistons simultaneously in the same direction, thereby swinging the blades simultaneously from left to right and from right to left, either of the window units A or B can be inverted (turned 180°) without reconnecting the various tubes in order to make one drive arm 8 move to the right as the other drive arm moves to the left. In such case the drive arm of that unit is reconnected to its drive shaft in a 180° reversed position.

Parking of the drive arms, as previously stated, is as shown by Figs. 1 and 2, and occurs merely as a result of gradually closing the speed control and shut-off valve 3. If the valve were arranged to be suddenly closed, then it would be possible to park the wiper blades in any position. Parking at a selected position, per Fig. 1, by gradual shutting off or throttling of pressure fluid to the actuator unit 1 occurs because the springs 27 and 28 tend to re-position the directional valve and slave valve as shown in Fig. 2 irrespective of the positions of the valves at the time the supply of fluid is reduced below the minimum operating pressure.

Assume first, movement of the window unit pistons 6 to the right at the time the valve 3 operates to throttle the supply flow. During attempted recycling of the actuator unit after the pistons reach the Fig. 2 positions, leakage from the chamber 100, along the piston land 90 to exhaust via the neck between lands 90 and 91, becomes at least as great as the input flow through the control valve 3, hence the pistons stay in the Fig. 2 positions.

If the fluid input is so reduced or throttled by the control valve 3 during movement of the window unit pistons to the left (actuator valve mechanism parts as in Fig. 3) such leakage from chamber 100 along the land 96 of the directional valve, by enabling spring return of said valve until port 47 is cut off, stops further movement of the window unit pistons to the left and then, by opening the valve ports of vertical passage 43, re-establishes an exhaust circuit for the outboard end of window unit B. Thereupon the spring 28 returns the slave valve to its Fig. 2 position completing the reversal of the supply circuit to the outboard end of window unit A. Meanwhile momentary continuance of fluid supply at low rate, during the remainder of the normal operation of shutting off of the control valve, causes return of the window unit pistons to their right hand positions. The low rate fluid supply, under the conditions mentioned, is insufficient to offset the leakage from chamber 100 and the actuator unit cannot recycle.

In order to cause the drive arms 8 to become parked at the right (pistons 6 to left) instead of in the illustrated parked position (Figs. 1 and 2) the service tube connections to the actuator unit 1 are reversed. The tube D is connected to service port B' and tube E to service port A'.

It will be evident that the strength of the directional valve spring 27 determines to torque output of the window unit mechanisms. In case of a relatively weak spring 27, the re-cycling of the actuator mechanism, final step of which is illustrated by Fig. 4, will occur with a less rise in pressure in the service system operating to force against the directional valve plunger face 99' than in the case of a strong spring 27. The strength of the return spring 28 for the slave valve has only to be slightly more than sufficient to overcome friction of the valve plunger and sleeve surfaces.

*Fig. 5.—Construction*

The modification of actuator unit shown by Fig. 5 enables positive and accurately timed operation of the valves at reduced operating pressure as compared to the minimum pressure required for the previously described arrangement. All parts are formed the same as before except for the slave valve 26a and its sleeve 16a. The parts are in the relative (normal) position corresponding to Fig. 2. A U-shaped passage 202 in sleeve 16a replaces the passage 102 in the valve sleeve 16 and provides an additional port 203 opening into the bore of the sleeve in spaced relation to the port formed by extension of the portion 40' of bore 40 through the wall of the slave valve sleeve. Additionally a relief bore 204 extends from the left end of the slave valve axially thereof and has a communicating lateral passage 205 open between lands 95 and 96 and an additional passage 206 open between lands 97 and 98.

*Fig. 5.—Operation*

When the slave valve is moved leftward to its first operating position (same as in Fig. 3) to trap operating pressure fluid in the chamber space 100, thereby temporarily to retain the directional valve in its Fig. 3 position, fluid from the pocket housing the slave valve spring 28 is first vented from the pocket by way of bore 204 and passage 205 and then by way of the passage 202 to boost the reversing-valve-holding pressure in the chamber 100 and assure full opening of the port 47 in the reversing valve sleeve. As soon as the land 95 cuts off passage 203 the neck between lands 97 and 98 of the slave valve opens the axial bore 204 in said valve to exhaust pressure at 41' thus allowing completion of the first movement (cf. Fig. 5) of the slave valve. The slave valve spring pocket during that movement is cut off from communication with the chamber 100 when land 95 closes the port 203 in the slave valve sleeve.

Reference to Fig. 3 and associated description of operation shows that the slave valve 26 is moved to its Fig. 3 position by pressure in piston chamber space 32' which pressure causes leftward movement of the window unit pistons. Prior to commencement of movement of the pistons of window units A and B to the left, the pressure in service line E, hence chamber 32', is higher than after the pistons start to move. The pressure drop consequent upon movement of the pistons is occasioned by the difference between static and dynamic friction force. When the pressure drop occurs in chamber 32' there is a slight movement of the slave valve 26 with its operating piston 31 to the right. That results in a momentary lowering of the pressure in chamber 100 and consequent slight movement of the directional valve 25 to the left. If the operating pressure is very low the movement just described is apt to cause the port 47 to be throttled by the valve land 92, and thereby an instantaneous slowing down of the leftward movement of the window unit pistons. Pressure immediately raises again in the service line E causing repositioning of the slave valve and directional valve and the window unit pistons move further to the left. Therefore, if the operating pressure in the system happens to be low, the leftward movement of the window unit pistons is unstable and jerky. Since in the Fig. 5 construction the pressure chamber 100 is not in communication with the chamber space which houses the slave valve spring 28 it follows that during such leftward movement of the window unit pistons as described there is no such unsteadiness of operation even at low fluid pressures.

*Modified window units*

Referring to Fig. 8 the view shows a window unit construction 110 enabling more effective locking of the wiper or wipers in parked or stopped positions than enabled by the construction previously described and as shown for example in Fig. 2. The construction also enables movement of the piston of one of (e. g.) two serially connected similar window units to continue operation when the wiper arm of the cooperating unit becomes stalled or blocked, regardless of the position of either piston in its cylinder when blocking occurs. Each window unit used in the system is identical with the one shown.

So far as the unit 110 of Fig. 8 has parts substantially identical with counterparts of unit A, Fig. 2, for example, those parts have the same identifying members as already given. The power piston 116 is shown in a position midway of the cylinder 9 so that the two reduced diameter extensions 117 of the piston are disengaged from their cooperating dashpot sleeves 118 which those extensions slidably enter as the piston approaches respective ends of its strokes. The priming passages 82 (see Fig. 2) and other parts are omitted from the piston 116 and, instead, priming fluid can by-pass the piston through a double check valve system and cooperating vent passages arranged as follows:

The piston has a central through bore 120 closed at its opposite ends by tubular check valve fittings 121 sealed into the extensions 117 and threaded to respective ends of the through bore. The fittings 121 have valve-seat-forming central bores or passages 122, open to their outer ends, and counterbores 123 in which spherical valve plugs (e. g. metal balls 124 and 125) have free sliding fit. Sleeve portions 126 of the fittings 121 are smaller than the bore 120 from the inner ends of the fittings to points beyond the valve seats, and restricted lateral passages 127 and 128 lead from the valve chamber spaces around the spherical plugs into the spaces surrounding the fitting sleeve portions 126. Those spaces are in free communication with a cross bore 129 in the piston body 116 leading to free spaces at each side of the piston as indicated at 129' on Fig. 7 showing the previously described form. Those free spaces 129' are in somewhat restricted one-way communication with the pressure space at each end of the cylinder past respective seals 75 of the piston. Fluid, in other words, is permitted restricted flow from, for example, the left hand pressure chamber 130 through the associated bore 122, past the check valve plug 124 through the vent 127 and finally into the pressure chamber 131 past the right hand piston seal 75. Restricted flow through the piston is likewise permitted in the opposite direction.

The check valve balls 124 and 125 are maintained normally in sealing relation to the bores 122 by a common spring 132 which maintains the check valves seated against a pressure considerably less than the operating pressure in the cylinders 130 and 131 such as will effect recycling of the automatic actuator valve unit 1. For example, if that unit takes 600 p. s. i. to cause its fluid reversing operation the spring 132 would be selected to hold the balls on their seats up to about 300 p. s. i.

The cushioning dashpot action, when the extensions 117 of the piston enter respective sleeves 118, is due to provision of restricted passages 134 and 135 in the dashpot sleeves which discharge fluid at a relatively slow rate from the sealed spaces around the piston extensions after they enter the sleeves.

Assuming the illustrated window unit of Fig. 8 is serving as unit A in Fig. 1, then the left hand cylinder fitting 60 is connected to the supply and exhaust line D of the actuator 1 Fig. 1 and the right hand fitting is secured to window unit connecting pipe C of unit B. The operation (at least insofar as it differs from that already described) is as follows:

Fluid entering the pipe D normally drives the piston 116 of the illustrated unit A to the right thus through the connecting pipe C driving the piston of the unit B to the right, both to the ends of their strokes, causing reversal or recycling of the actuator valve mechanism as already described. If at completion of the strokes of the pistons to the left the wiper of unit B becomes stalled in end stroke position its piston will not move from the inboard position. Thereupon the inboard (left hand) ball valve 124 of unit B is forced off its seat, the check valve spring 132 having insufficient force to effect recycling of the actuator 1. The resulting restricted flow through vent 127 past the unit B piston enables full stroke operation of the unit A piston to the right until the inboard end of that piston enters its dashpot and completes the rightward stroke, thereby causing recycling of the actuator unit 1. Then, if the piston of unit B remains stalled, the right hand ball 125 thereof is forced off its seat and fluid is enabled to flow toward unit A through the restricted vent 128 of unit B, past the inboard seal 75 of that unit and through the associated dashpot vent 134 to the chamber 131 of unit A permitting completion of the left hand stroke of unit A. Stalling of the unit B piston in any other than an extreme position also enables the unit A to continue operation. If the unit B piston stalls at the end of its rightward stroke (piston extension 117 thereof in the outboard dashpot sleeve) the piston of unit A will be supplied for return stroke through opening of the check valve 125 of unit B and thence through the bypass route as just described but without restriction at 134. If either piston (e. g. unit A) becomes stalled in a mid stroke position, it is evident from Fig. 8 that the bypass system operates as before to enable movement of the other piston in both directions. In such case, as the balls 124 and 125 unclose, direct flow past the unseated ball through its bore 123 to the cross passage 129 is blocked by the sliding fit of the ball in said bore. Thus the rate of supply through a stalled piston to the other unit is controlled always at least primarily by the size of the vent passages 127 and 128.

Parking is controlled and effected exactly as with the previously described arrangement, being initiated by slowly closing the control valve 3, Fig. 1. Since at parking pressure both valves 124 and 125 are closed by their spring 132 fluid is trapped in the chamber 130 or the chamber 131 depending upon whether the parking position of piston 116 is at the right or left, the units being reversible in that respect. The check valve and spring arrangement enable the pistons 116 to be hydraulically locked in any position within the capacity of the spring 132 to hold the balls 124 and 125 from being forced off their seats. The window units 110 operate to maintain or tend to maintain the wipers in synchronism irrespective of unequal loading in the same manner as do the previously described units, since, by opening the check valves, restricted amounts of fluid are free to by-pass either piston in opposite directions regardless of the relative positions of the pistons in their cylinders.

I claim:

1. A pressure sensitive fluid circuit establishing valving mechanism comprising two valves, biasing means initially maintaining the valves in a first circuit-establishing initial position, means whereby a rise in pressure of fluid in the established circuit moves the valves into a second circuit establishing position, valve-position-retaining means rendered operative by said movement of one of the valves to hold the other valve in its moved position, and means operated by a rise in pressure in the second established circuit to release the position-retaining means and enable return of both valves by their biasing means to their initial position.

2. A pressure sensitive fluid circuit reversing valving mechanism comprising two spring biased valves initially maintained by their springs in a first circuit-establishing position, means whereby fluid pressure rise in the established circuit moves the valves into circuit reversing position, fluid trapping means rendered operative by said movement of one of the valves to hold the other valve in its moved position, and means operated by fluid presure rise in the reversed circuit to release the fluid trapping means and enable return of both valves to their initial position.

3. A fluid directing valve mechanism for controlling distribution of operating fluid in a closed loop reciprocating servomotor system wherein reciprocating motion results from alternately supplying and exhausting fluid to and from opposite ends of the loop, said mechanism comprising a pair of spring biased valve plungers and cooperating ports and passages so arranged that a predetermined rise in pressure fluid in a first-established circuit in the loop first moves both plungers against the bias of their springs to a fluid-circuit-reversing relative position in respect to the loop, port and pressure chamber means associated with one plunger and controlled by movement of the other plunger to its fluid reversing position to constitute a fluid trap operative to hold said one plunger in its said position, and other pressure operated means actuated by a rise in reversed circuit pressure in such loop for moving said other valve plunger to a second position in which the trapped fluid is released to enable the mechanism to re-cycle.

4. A pressure sensitive fluid circuit reversing valving mechanism comprising two valve plungers normally held by respective springs in a first circuit-establishing position, pressure responsive means operatively associated with the respective plungers, communicating with the first circuit and operated by a rise in pressure thereof to move both plungers into circuit-reversing relative position, fluid trapping valve means controlled by such movement of one of the plungers to hold the other plunger in its circuit-reversing position, and other pressure responsive means operatively connected with said one plunger, communicating with the second circuit and rendered operative by a predetermined rise in the pressure thereof to impart further movement to said one plunger, and valving means operated by said one plunger to release the trapped fluid whereby to enable return of said other plunger to its first circuit-establishing position.

5. Reversing valve mechanism for fluid pressure operation of a reciprocating servomotor having its opposite ends connected in closed loop circuit arrangement with the valve mechanism through a pair of service ports thereof acting alternately as supply and return ports, said mechanism comprising a spring biased directional valve normally positioned by its spring to divert supply pressure to a first service port, a cooperating spring biased valve normally positioned by its spring to enable exhaustion through the valve mechanism of fluid through a second service port, pressure operated means respectively associated with the directional valve and cooperating valve and acting thereon, consequent upon a predetermined rise in pressure of fluid admitted to the mechanism, to move said valves to respective first operating positions reversing the supply and exhaust fluid circuits through the mechanism, position retaining means connected for operation by the cooperating valve in its first operating position to hold the directional valve in its first operating position until the servomotor is blocked against further movement, and other pressure operated means acting on the cooperating valve consequent upon occurrence of such blocking to move it to a position-retaining-means-releasing second operating position enabling spring-return of the directional valve to its normal position, thereby rendering inoperative both pressure operated means of the cooperating valve to enable return of the latter to its normal position.

6. A fluid motor actuator unit comprising a body having a pressure fluid inlet port, pressure fluid service ports and an exhaust fluid outlet port, with passages interconnecting said ports, a spring biased pressure operated fluid directing valve plunger, a spring biased slave valve plunger and a pressure operated servomotor for positioning the slave plunger against the bias of its spring, said plungers being cooperatively movable to open and close valving ports of the body communicating with said passages alternately to connect the service ports with the pressure inlet and exhaust port, the directing valve plunger being initially moved against its biasing spring by inlet pressure fluid to establish inlet pressure to one service port and the servomotor, and the slave plunger thereby moving against its biasing spring to communicate the other service port with a passage leading to the exhaust port, said slave valve plunger simultaneously trapping fluid in a manner to hold the directing valve in the stated position, said slave valve plunger having a piston portion communicating with pressure fluid being delivered to said one service port for operating the slave valve plunger in the same direction as the slave plunger is moved by the servomotor whereby to release the trapped fluid and enable spring return of said plungers and the servomotor to their original positions.

7. A fluid pressure operated system comprising a plurality of servomotors arranged in series with each other and connected respectively with alternately acting fluid supply and exhaust lines, reversing valve mechanism connected with said lines and operable automatically to supply and exhaust fluid in respect thereto consequent upon a predetermined rise in fluid supply pressure alternately in said lines, each of said servomotors comprising a cylinder and a piston reciprocatable therein, and fluid operated servo-motor synchronizing means including axially extending primer passages in the pistons each having a throttling valve port positioned to be closed by a cooperating cylinder surface as the pistons reach the ends of their strokes in one direction, whereby to enable by-passing movement of fluid in one of the pistons to and from opposite end spaces of its cylinder in event the throttling valve port of such one piston remains unclosed when the valve port of another piston is closed.

8. In combination with an automatic reversing valve for fluid in two service lines arranged to recycle itself upon a predeterminable rise in service line pressure, a plurality of piston and cylinder units in series and connected with said lines, the piston of each unit having a through bore, a pair of oppositely acting non-return valves in each bore opening from the outer end of each against a biasing means responsive to less pressure than the recycling pressure of the reversing valve and restricted vent passages associated with each non-return valve behind respective plugs thereof and arranged to enable by-passing of operating fluid through one unit to another without stalling the other unit or recycling the reversing valve.

9. The combination according to claim 8 wherein each piston and cylinder unit has a restricted-fluid-venting dashpot at each end arranged to become respective parts of said vent passages when one piston is held in end stroke position while another piston is moving in its cylinder.

COLUMBUS R. SACCHINI.

REFERENCES CITED

The following references are of record in the file of this patent:

UNITED STATES PATENTS

| Number | Name | Date |
|---|---|---|
| 2,069,122 | Weaver | Jan. 26, 1937 |
| 2,169,451 | Parker | Aug. 15, 1939 |
| 2,202,023 | Parker | May 28, 1940 |
| 2,292,916 | Wheelon | Aug. 11, 1942 |
| 2,298,457 | Berges | Oct. 13, 1942 |
| 2,359,949 | Van Der Werff | Oct. 10, 1944 |
| 2,446,611 | Rose | Aug. 10, 1948 |
| 2,516,558 | Freedman | July 25, 1950 |
| 2,516,594 | Rose | July 25, 1950 |